(12) United States Patent
Johannboeke et al.

(10) Patent No.: US 8,894,125 B2
(45) Date of Patent: Nov. 25, 2014

(54) MOTOR VEHICLE INTERIOR PANELING COMPONENT MADE OF PLASTIC

(75) Inventors: Eckhard Johannboeke, Endingen (DE); Michael Klipfel, Wyhl (DE)

(73) Assignee: SMP Deutschland GmbH, Bötzingen (DE)

( * ) Notice: Subject to any disclaimer, the term of this patent is extended or adjusted under 35 U.S.C. 154(b) by 0 days.

(21) Appl. No.: 13/438,472

(22) Filed: Apr. 3, 2012

(65) Prior Publication Data
US 2012/0256440 A1 Oct. 11, 2012

(30) Foreign Application Priority Data
Apr. 5, 2011 (DE) .................. 20 2011 004 899 U

(51) Int. Cl.
*B62D 25/14* (2006.01)
*B60H 1/00* (2006.01)
*B60K 37/00* (2006.01)
*B60H 1/22* (2006.01)
*B60R 13/02* (2006.01)

(52) U.S. Cl.
CPC ...... *B60H 1/2225* (2013.01); *B60H 2001/2293* (2013.01); *B60R 13/0256* (2013.01); *B60H 1/00271* (2013.01); *B60R 2013/0287* (2013.01); *B60R 13/02* (2013.01)
USPC .......................................... 296/39.3; 296/70

(58) Field of Classification Search
USPC .................................................. 296/70, 39.3
See application file for complete search history.

(56) References Cited

U.S. PATENT DOCUMENTS

| | | | |
|---|---|---|---|
| 7,462,388 B2 * | 12/2008 | Koide et al. | 428/323 |
| 2001/0017457 A1 * | 8/2001 | Bieber et al. | 280/728.3 |
| 2009/0194525 A1 * | 8/2009 | Lee et al. | 219/553 |

FOREIGN PATENT DOCUMENTS

| | | |
|---|---|---|
| DE | 200 03 365 U1 | 9/2000 |
| DE | 199 24 270 A1 | 11/2000 |
| DE | 100 29 095 C2 | 11/2002 |
| DE | 10 2006 050 533 A1 | 4/2008 |
| DE | 10 2008 045 757 A1 | 3/2010 |
| DE | 10 2008 047 690 A1 | 3/2010 |
| DE | 10 2008 047 291 A1 | 4/2010 |
| DE | 10 2009 012 673 A1 | 9/2010 |
| EP | 1 386 177 B1 | 8/2005 |

* cited by examiner

*Primary Examiner* — Glenn Dayoan
*Assistant Examiner* — Melissa A Black
(74) *Attorney, Agent, or Firm* — Ursula B. Day; Law Firm of Ursula Day

(57) ABSTRACT

The invention refers to a interior paneling component for a motor vehicle made substantially of plastic, wherein at least a portion of the surface of the interior paneling component is heatable and the temperature of the at least one portion can be controlled.

11 Claims, 2 Drawing Sheets

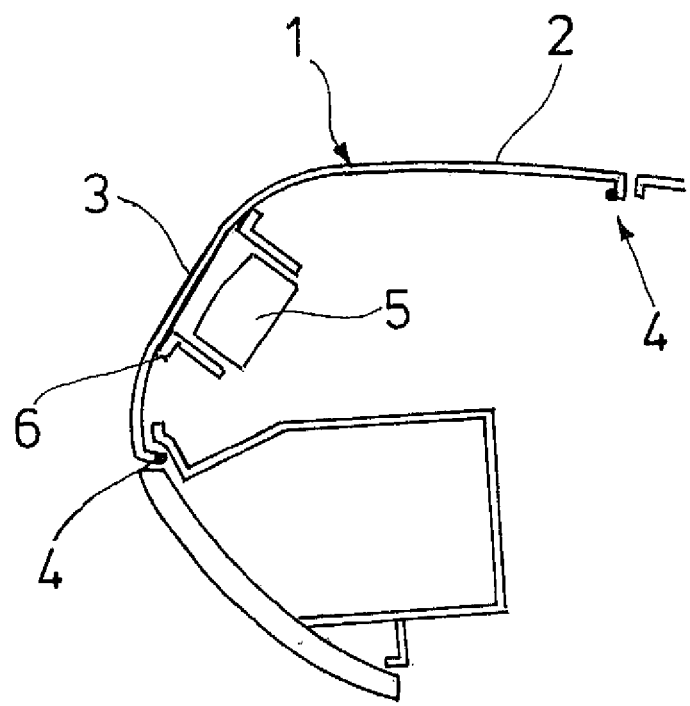

MOTOR VEHICLE INTERIOR PANELING COMPONENT MADE OF PLASTIC

CROSS-REFERENCES TO RELATED APPLICATIONS

This application claims the priority of German Patent Application Serial No. 20 2011 004 899.3 filed Apr. 5, 2011 pursuant to 35 U.S.C. 119(a)-(d), the subject matter of which is incorporated herein by reference.

BACKGROUND OF THE INVENTION

The present invention refers to interior paneling components for a motor vehicle substantially made from plastic, in particular, a dash board, a door or, a lateral paneling component.

Heating the interior of a motor vehicle is normally done via a ventilation system which is fed by the heat generated by the running motor and which heats the interior of the motor vehicle.

The patent literature describes alternative solutions for heating interiors of motor vehicles. Thus, the DE 100 29 095 C2 describes a process for emission-free heating of motor vehicle interiors through the effect of electromagnetic waves (microwaves) on semi conductive organo polysiloxane-elastomers and the conversion into heat energy. Thereby, the microwaves affect the conductive solid state particles that are embedded into the elastomers and that produce heat energy in the interior of the elastomeric body.

EP 1 386 177 B1 describes heat control of motor vehicle interiors with the aid of phase shift materials Thereby, a first phase shift material is built into the inside roof lining, a second phase shift is built into the seats and a third phase shift material is built into the dash board. With the aid of the phase shift materials that exhibit melting points in different temperature ranges between 30° C. and 43° C., the temperature of the motor vehicle interior can be stabilized relative to temperature fluctuations.

Both of the afore-described techniques have so far not yet found practical application, so there is still a need provide an improved application other than the most conventional heat controls.

SUMMARY OF THE INVENTION

Thus, it is an aspect of the present invention to provide advantages over the prior art in the heating techniques for the interior of motor vehicles. This aspect and others include a component for interior paneling for a motor vehicle having features that are advantageous over the prior art. For example, an interior paneling component for motor vehicles which is substantially made from plastic includes that at least a portion of the surface of the interior paneling is heatable and the temperature in the portion of the component surface can be controlled. Advantageous embodiments and further developments of the present invention are reflected in the dependent claims.

The present invention is based on the idea to provide surfaces in the interior of the motor vehicle interior with thermic functions, which surfaces heretofore were designed to only fulfill visual or haptic requirements. Such surfaces were in particular those having big smooth surfaces, such as for example, a dash board, the interior paneling of the doors or other interior paneling components.

Furthermore, it is possible to also emboss or grain the surfaces of these components. Other interior components for possible thermic function are for example, glove compartment covers, the steering wheel, leg room space paneling, mid-console paneling, arm rests, door mirrors or handles.

It is also another particular aspect of the present invention to improve the comfort in the interior space of the motor vehicle.

This aspect and others are realized by means of an interior paneling component for a motor vehicle made substantially from plastic, wherein at least a portion of the surface of the interior paneling component is heatable and the temperature of the component surface can be controlled. It has been found that radiant heat emitted below body temperature is experienced as extremely pleasant so heating a dash board, a door railing, an arm rest or a side paneling would be experienced as a pleasant environment.

It was also found that all plastic surfaces of the motor vehicle interior are suitable for an additional thermic function. Thus, according to the present invention, injection molded decorating surfaces, films, foils, form skins, i.e. slush-skins, spray skins, cast skins or solid skins, but also support surfaces that do not directly border on the interior of the motor vehicle can be utilized for a thermic function.

The heat conduction into the decorating surface is then carried out via the support. Furthermore, intermediate layers between the decorating- and support part can be conductive. These can be, for example, PU R-foam or polyolefinic foams. These can also be adhesive layers (i.e. hot melt, dispersions etc.) or, adhesive beads.

The thermic function according to the present invention is realized in that either the at least one heatable and thermically controllable portion of a plastic surface of the interior paneling in a motor vehicle is itself electrically conductive, or that the interior paneling component comprises at least one electrically conductive area arranged in direct proximity to the at least one heatable and thermic portion of the surface of the interior paneling component.

Electrical conduction of that portion can be realized in various ways. Thus, these can be flexible circuit boards, threads that are wound with metal wire, plastic pastes or lacquer systems filled with carbon-nano-tubes, injection molded components that comprise carbon-nano-tubes, carbon fiber weaves, cable heating systems and combination of two or more of the foregoing systems can be utilized in order to realize an electrical conductivity.

Especially advantageous electrical properties are realized through the use of carbon-nano-tubes. These are microscopically small tube-shaped bodies from carbon (carbon-nano-tubes) that are built from honeycombed structured carbon atoms. Depending on the composition of the structure, the carbon-nano-tubes possess metallic conductivity or semiconductor properties. In addition, the carbon-nano-tubes possess an extraordinary high heat conductivity and an extremely high tensile strength. When mixing the carbon-nano-tubes with plastic, the properties of plastic can be varied and improved. Thus, the mechanical, electrical and thermic properties of plastic material can be optimized through mixing with carbon-nano-tubes and it is thus possible to produce electrically conductive plastics.

The carbon-nano-tubes can be directly mixed into the injection molding material or can be added at the machine for example as master batch or powder.

In connection with the present invention, the carbon-nano-tubes can be utilized in different ways. For example, corresponding conductive areas are obtained through depositing pastes or lacquer systems filled with carbon-nano-tubes. Also, injection molded components that are directly mixed with carbon-nano-tubes, whereby these can be utilized again as one component injection molded components and the entire wall thickness of the component is mixed with carbon-nano-tubes and thus are conductive. This variant is however relatively expensive. Less costly components can be obtained in a two-component injection molding process, where the conductive area with the integrated carbon-nano-tubes with a minimal wall thickness is cast or partially injection molded. A further possibility for utilizing carbon-nano-tubes is to pour hot plastic melt mixed with carbon-nano-tubes into grooves of a support material, whereby the grooves are arranged in the portion to be heated for example, in a snaking pattern.

Further possibilities for the use of carbon-nano-tubes within the scope of the present invention include mixing the carbon-nano-tubes directly into the foils or the materials for skins (slush-, solid-, injection-, spray-skins) and to use them in a manner such that conductive surfaces result therefrom.

Additionally, when using slush-skins and injection molding parts, the streaming flow can be controlled through a different wall thickness of the conductive area, such that surfaces that are tapering to a point can also be heated in a regulated and controlled manner. For example, through a continuous reduction of the wall thickness, the resistance of a tapering surface can be raised.

In slush skins consisting of several layers, certain targeted layers can be configured as conductive layers, such that, for example, the uppermost layers remain unchanged, while a layer directly underneath is configured conductively, which has the advantage that for the upper layer a known and tested material can be used covering and protecting the conductive layer. A further advantage is that in this manner, the cost for expensive carbon-nano-tubes containing filler can be saved.

The present invention is however not limited to carbon-nano-tubes or plastics that comprise carbon-nano-tubes, but also encompasses graphene, or also conventional systems, such as for example, flexible circuit boards, thread wound with metal wire, carbon fiber weaves, cable heating systems or combinations of two or more of the above named systems.

Especially through the combination of different systems, any disadvantages of each of the systems can be compensated. For example, flexible circuit boards are very sensitive to being bent and are thus used for only certain configurations; but they have proven successful in a number of applications. Plastic fibers that are wound with metal wire (yarn) are flexible and have proven well in the area of textile applications and are for example, used for heating of seats, whose heating elements consist of flexible electrical lines that are embedded in the seat cover, snaking through the cover. Such metal wire wound yarns can be used as weaves or knits within the scope of the present invention.

In carbon fiber weaves, also within the scope of the present invention, a known technique is to use press-backed carbon fiber weaves that are embedded within the plastic surface.

As a further conventional technique, a cable system can be utilized within the scope of the present invention, where the heating cables a back molded or are placed into a groove in a plastic support.

The respective contact of the electrically heated surfaces depend from each of the systems selected, wherein it is possible to rely on conventional systems. Alternatively, carbon fiber plaits or rowing can be used. Following are details of only those systems containing carbon-nano-tubes. For example, when using plastic pastes or lacquer systems filled with carbon-nano-tubes an evenly thick layer must be deposited, which is realized in a simple manner on plane surfaces, whereby the contact is made for example via a glued metal band. With carbon-nano-tubes filled one component-injection molded parts, the contact can be made via corresponding lay-outs at the sprue. The same goes for the two component injection molding. In that case, correspondingly laid-out sprues can also be provided for producing the component. Further contact possibilities are with electrically conductive surfaces that contain carbon-nano-tubes and use of copper plaiting or copper cords that are arranged in parallel disposition at opposite sides of the conductive surfaces.

An especially interesting application of interior paneling components according to the present invention, is for use in dash boards or side paneling that covers an air bag. When heating these portions, a markedly improved opening function can be realized and the feared splintering that happens at lower temperatures can be prevented. By heating the area of the airbag covering, the opening function of the air bag is generally made easier and can be taken into account when designing the air bag opening, especially also the weakened lines of the airbag cover, such that the weakened lines themselves need be less pronounced, thereby providing an optical advantage. It is understood that heating does not have to be only in a portion of the dash board, but can include the entire dash.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 a section illustrating the dash board of FIG. 1.

DETAILED DESCRIPTION OF PREFERRED EMBODIMENTS

Figure 1:
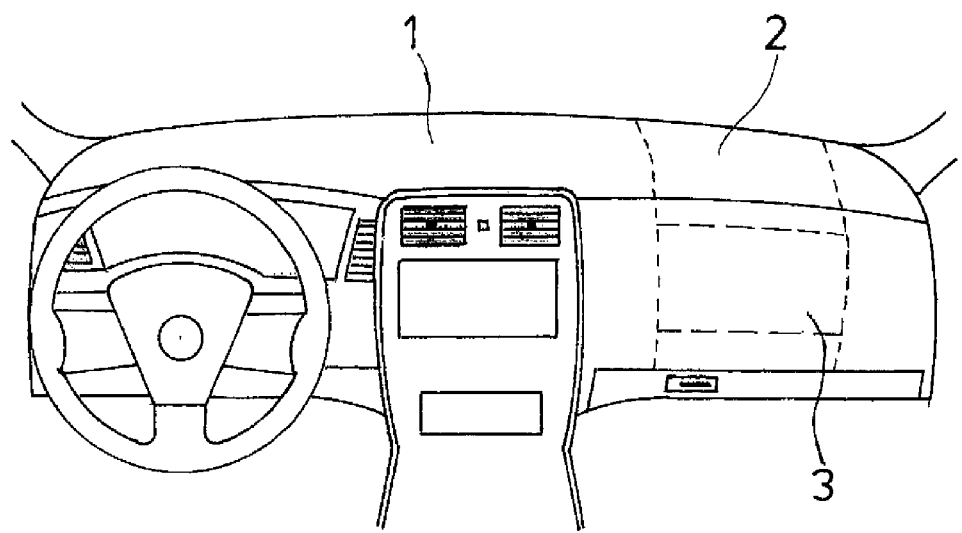
FIG. 1 a top view onto a dash board according to the present invention.

Throughout all the Figures, same or corresponding elements are generally indicated by same reference numerals.

FIG. 1 shows a dash board 1 in a top view showing a portion 2 that can be heated, which portion 2 also covers an airbag opening area 3. FIG. 2 shows a cross section of the dash board 1 of FIG. 1, enlarged. At the upper and lower edges of the dash board 1, contacts 4 are shown. The heatable portion 2 of the dash board 1 extends across the height of dash board 1 between two points of contacts 4 and thereby also covers the air bag opening area 3. The air bag is referenced with 5 and the air bag deployment channel is referenced 6.

In principle, all afore-described heating system can be used for the dash board as shown in FIG. 1 and FIG. 2. Especially advantageous is the use of plastics that contain the carbon-nano-tubes, whereby this heating system can be realized in either a one-component injection molded part, a two component injection molded part or where carbon-nano-tubes are also directly placed into the surface skin.

The present invention is of course not limited to dash boards or side paneling, but all interior paneling components can be provided with heating surfaces, whereby normally the required electric current is supplied by the motor vehicle battery. An especially preferred embodiment provides that the current is supply by solar panels that are located either exterior of the motor vehicle or they can be also in the interior of the motor vehicle, for example, at a place of deposit at the rear of the car. The temperature can be conveniently controlled via current changes and can be carried out either stepwise or in a continuous manner.

While the invention has been illustrated and described as embodied in a dash board, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. An interior paneling component for motor vehicles substantially made from plastic comprising:
a surface, wherein at least a portion of the surface area of the interior paneling component for motor vehicles is electrically conductive and thus heatable and the temperature in the portion of the said paneling component surface is controlled, wherein the electric conductivity of the at least one electrically conductive portion is realized by carbon-nano-tubes injection-molded into the plastic material forming said surface of the interior paneling component.

2. The interior paneling component according to claim 1, wherein the surface is an injection molded decorating surface, a foil, a form skin, a slush-skin, injection molded skin, a spray skin, a cast skin or a solid skin.

3. The interior paneling component according to claim 2, wherein the surface is a support surface not directly bordering the interior of the motor vehicle.

4. The interior paneling component according to claim 1, wherein the surface of plastic is smooth or grained.

5. The interior paneling according to claim 1, wherein the interior paneling component comprises at least one electrically conductive area in direct proximity to the portion of the surface of the interior paneling component that is heatable and thermally controlled.

6. The interior paneling component according to claim 2, further comprising at least an intermediate layer between a decorating layer and a support, said intermediate layer is electrically conductive and consisting of foam or adhesive.

7. The interior paneling component according to claim 1, wherein the electric conductivity of the at least one electrically conductive area in addition to utilizing nano-tubes, is based on one or more of the group consisting of:
i) flexible circuit boards,
j) yarn wound with metal wire,
k) plastic pastes or lacquer systems filled with carbon-nano-tubes,
l) plastic pastes filled with carbon-nano-tubes injection molded components,
m) carbon fiber weaves
n) a cable heating system,
o) carbon fiber-plaiting or rowing, and
p) graphene.

8. The interior paneling component according to claim 7, wherein the components containing carbon-nano-tubes are
d) one component-injection molded parts
e) two or more component injection molded parts, or
f) injection molded parts containing conductive carbon-nano-tubes strands.

9. The interior paneling component according to claim 2, wherein the electric conductivity of the at least one electrically conductive area is based on a direct incorporation of the carbon-nano-tubes into the foils-, form skins-, slush skin-, injection molded skin-, solid- or spray material.

10. The interior paneling component according to claim 1, wherein the at least one heatable portion of the interior paneling component comprises an air bag area.

11. The interior paneling component according to claim 1, wherein the heating of the at least one heatable portion is by electric current supplied from solar panels or motor vehicle battery via a contact and adjusted to an electrically conductive area, and wherein the temperature of the heatable portion is controlled through voltage changes.

* * * * *